United States Patent [19]
Nomura et al.

[11] Patent Number: 5,684,428
[45] Date of Patent: Nov. 4, 1997

[54] SENSOR APPARATUS CAPABLE OF PREVENTING HIGH FREQUENCY NOISE

[75] Inventors: Hiroshi Nomura, Nagoya; Kazuhisa Ikeda, Chiryu, both of Japan

[73] Assignee: Nippondenso Co., Ltd., Kariya, Japan

[21] Appl. No.: 552,789

[22] Filed: Nov. 3, 1995

[30] Foreign Application Priority Data

Nov. 4, 1994 [JP] Japan .................................. 6-270836
Oct. 13, 1995 [JP] Japan .................................. 7-265342

[51] Int. Cl.⁶ ..................... H03K 5/00; H03K 17/14
[52] U.S. Cl. .................. 327/509; 327/516; 327/532; 327/311; 327/551; 327/552; 327/558
[58] Field of Search ........................ 327/551, 552, 327/558, 560, 309, 310, 311, 509, 512, 530, 532, 101, 190, 516

[56] References Cited

U.S. PATENT DOCUMENTS

| | | | |
|---|---|---|---|
| 4,723,299 | 2/1988 | Kobayashi | 327/310 |
| 5,508,651 | 4/1996 | Burri | 327/512 |

FOREIGN PATENT DOCUMENTS

| | | |
|---|---|---|
| 55-155253 | 12/1980 | Japan . |
| 57-169644 | 10/1982 | Japan . |
| 58-112424 | 7/1983 | Japan . |
| 2-68519 | 5/1990 | Japan . |
| 2-242121 | 9/1990 | Japan . |
| 5-327264 | 12/1993 | Japan . |

OTHER PUBLICATIONS

"Ceramic absorber for preventing Electro Magnetic Interference," Catalog of Nippondenso Products, Nov. 1980.
Patent Abstract of Japan, vol. 017 No. 549 (E–1443), 18 Jun. 1993 re JP–A 05–153782.
M.S. Tillack et al, "Measurement of small strain in a noisy environment" Review of Scientific Instruments, vol. 56 No. 9 Sep. 1985 pp. 1708–1709.

*Primary Examiner*—Terry Cunningham
*Assistant Examiner*—Dinh T. Le
*Attorney, Agent, or Firm*—Cushman, Darby & Cushman IP Group of Pillsbury Madison & Sutro LLP

[57] ABSTRACT

A sensor apparatus is capable of removing RF noise. The sensor apparatus is comprised of a first power supply line connected to a power supply terminal; a second power supply line separately branched from the first power supply line and connected thereto; an output line; and a sensor circuit unit connected to the first power supply line so as to receive power therefrom, and for detecting a condition of an article under measurement to output a detection signal to the output line. In this sensor apparatus, the sensor circuit unit includes an operational amplifier operated by accepting the power supplied from the second power supply line, which performs the detection operation; a first filter circuit is connected to the first power supply line defined from a branch point between the first power supply line and the second power supply line to the first power supply line; a second filter circuit is connected to the second power supply line; and a third filter circuit is connected to the output line.

17 Claims, 5 Drawing Sheets

SENSOR APPARATUS CAPABLE OF PREVENTING HIGH FREQUENCY NOISE

CROSS REFERENCE TO RELATED APPLICATION

This application is based upon and claims the benefit of priority of the prior Japanese Patent applications No. 6-270836 filed on Nov. 4, 1994 and No. 7-265342 filed on Oct. 13, 1995, the contents of which are incorporated herein by reference.

BACKGROUND OF THE INVENTION

1. Field of the Invention

The present invention relates to a sensor apparatus. More specifically, the present invention relates to a sensor apparatus capable of preventing high frequency noise.

2. Related Arts

This sort of sensor apparatus is known, for instance, semiconductor pressure sensors are known. As described in Japanese Laid-open Patent Application No. 55-155253 and Japanese Laid-open Patent Application No. 2-242121, the bridge circuit is constituted by way of the strain gage with the diffusion resistors, the resistance values of which are varied in response to the pressure under measurement. The two output signals from this bridge circuit are differential-amplified by the differential amplifier. In this bridge circuit, the pressure to be measured is conducted into the case via the pressure conducting pipe provided in the case, the diaphragm is displaced in response to the conducted pressure, and then the resistance value of the strain gage is varied in accordance with displacement of this diaphragm. The circuit unit (sensor circuit unit) containing this strain gage is provided within the case.

When RF noise or high frequency noise is externally entered into the case via the power supply input line (referred to as "power supply line" hereinafter), the ground line and the output line to the sensor circuit unit, such a semiconductor pressure sensor cannot perform the stable sensing operation. Therefore, a certain measure (anti-EMI measurement) for such an RF noise is required.

As indicated in Japanese Laid-open Patent Application No. 57-169644, as this RF noise measure, the feed-through (lead-through) capacitor is provided in the case. The above-described power supply line, ground line, and output line are connected via this feed-through capacitor, so that the RF noise is bypassed from the feed-through capacitor to the case.

However, when such a feed-through capacitor is provided in the case, additional space is required to store this feed-through capacitor. Thus, there is a problem that the overall sensor apparatus would necessarily become bulky. In this sort of sensor apparatus, there are substantial limitations in the mounting spaces. That is, a more compact sensor apparatus is required, and a novel RF noise measure would be strongly required instead of the above-described feed-through capacitor.

SUMMARY OF THE INVENTION

The present invention has been made to solve the above-described problems, and therefore, has an object to provide a compact sensor apparatus capable of preventing RF noise without providing a feed-through capacitor in a case thereof.

To achieve the above-described object, in a sensor apparatus according to the present invention, a power supply line V' for an operational amplifier's power source is provided in a sensor circuit in addition to a power supply line V. A first filter circuit is arranged from a branch point A between the power supplying line V and the power supply line V' to the power supply line V for the sensor circuit unit. Also, a second filter circuit is arranged in the power supply line V'. Further, a third filter circuit is arranged in an output line from the sensor circuit unit.

With this circuit arrangement, the sufficient RF noise measure can be taken without providing the feed-through capacitor in the case.

Also, when a sensor apparatus is manufactured by way of an integrated sensor chip structure, a more compact sensor apparatus can be constructed.

BRIEF DESCRIPTION OF THE DRAWINGS

These and other objects, features and characteristics of the present invention will be appreciated from a study of the following detailed description, the appended claims and the drawings, all of which form a part of this application. In the drawings:

DETAILED DESCRIPTION OF THE PRESENTLY PREFERRED EXEMPLARY EMBODIMENTS

Referring now to the drawings, a semiconductor pressure sensor functioning as a sensor apparatus according to the present invention will be described.

Figure 2:
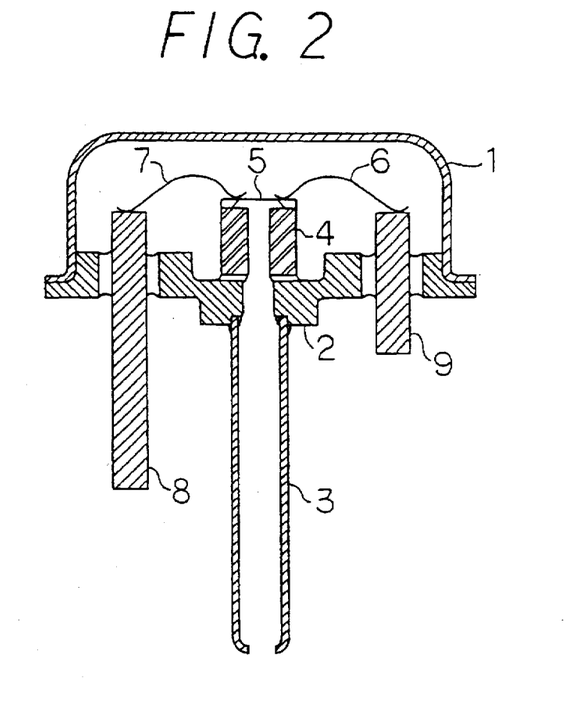
FIG. 2 is a sectional view for showing a structure of the semiconductor pressure sensor.

FIG. 2 shows an overall structure of the semiconductor pressure sensor. An upper case 1 is jointed with a lower case 2 to construct a case, and a pressure conducting pipe 3 for conducting pressure to be measured (for instance, air intake pressure of an automobile engine) is mounted on this case. The pressure conducted by using this pressure conducting pipe 3 is conducted via a seat 4 made of pyrex glass to an integrated sensor chip 5 in which the pressure is detected.

Figure 3:
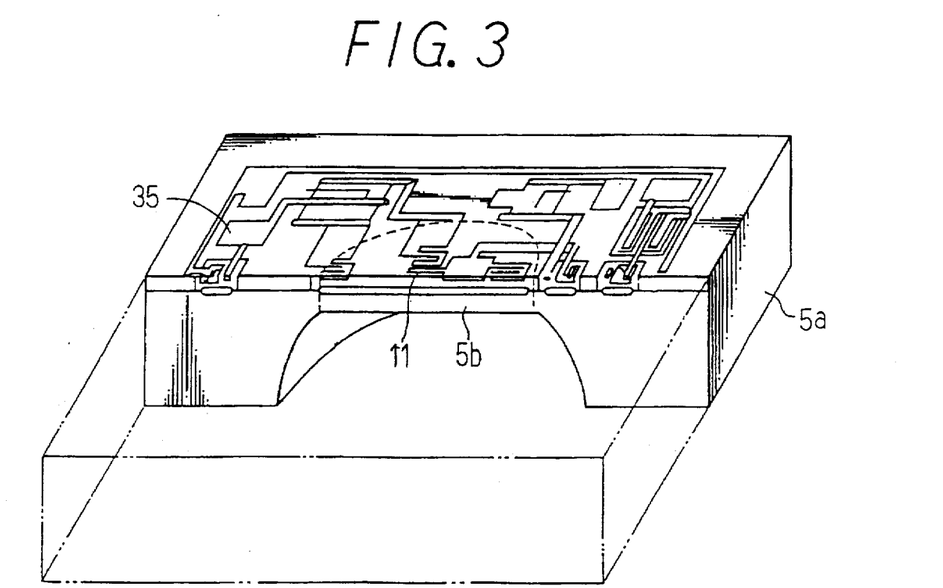
FIG. 3 is a perspective view for indicating the structure of an integrated sensor chip.

As indicated in FIG. 3, this integrated sensor chip 5 is fabricated in such a manner that a diaphragm 5b is formed by a silicon chip 5a, and a pressure detecting circuit unit (sensor circuit unit) for detecting displacement of the diaphragm 5b is manufactured on this silicon chip 5a in an integrated form.

A power supply line, a ground line and an output line to this integrated sensor chip 5 are externally conducted via bonding wires 6 and 7 and output terminals 8 and 9, as illustrated in FIG. 2. It should be noted that although two sets of bonding wires 6, 7 and output terminals 8, 9 are employed in FIG. 2, three sets thereof are actually provided in correspondence with the relevant wiring circuits.

Next, an arrangement of the pressure detecting circuit unit for detecting pressure will now be described with reference to FIG. 1. This pressure detecting circuit unit is connected through a power supply line V, an output line O, and a ground line G to external circuits.

In a pressure sensing region of the diaphragm 5b shown in FIG. 3, strain gages 11 to 14 are fabricated by diffusing an impurity. With these strain gages, a bridge circuit 100 (sensor means) is constructed, as indicated in FIG. 1. It is so designed that the resistance values of the strain gages located at one diagonal position of the strain gage bridge circuit are increased in response to a pressure increase, whereas the resistance values of the strain gages located at the other diagonal position thereof are decreased in response to a pressure increase. It should also be noted that although 4 sets of these strain gages are preferably employed, the bridge circuit may be constituted by employing two sets of strain gages in such a manner that these strain gages are provided at the respective bridge sides, and other bridge elements are fixed resistors, or one strain gage and a fixed resister. Variable resistors 15 and 16 are employed so as to correct an unbalanced voltage of the bridge circuit 100.

A constant current is supplied from a constant current circuit 200 constructed of resistors 17 to 20 and an operational amplifier 29 and so on to this bridge circuit 100. In other words, such a current is furnished to the bridge circuit 100, which is produced by dividing a voltage difference between a power supply voltage and a reference voltage by a resistance value of a resistor 19. This reference voltage is derived by subdividing the power supply voltage by resistors 17 and 18. Upon receipt of this constant current, the bridge circuit 100 outputs voltages V1 and V2 in response to the pressure applied to the diaphragm 5b.

These voltages V1 and V2 are differentially amplified by an amplifier circuit 300. This amplifier circuit 300 is constructed of operational amplifiers 30 to 32, transistors 33, 34, and resistors 21 and 25 etc. The voltage V1 from the bridge circuit 100 is applied to a non-invert input terminal of the operational amplifier 31, whereas the voltage V2 from the bridge circuit 100 is applied via the operational amplifier 30 and the resistor 21, which may function as a buffer, to an invert input terminal thereof. Both of these input voltages are differentially amplified by the operational amplifier 31, and then the transistors 33 and 34 are controlled based upon the output signal derived from this operational amplifier. With this operation, the output voltage (V1–V2) of this bridge circuit 100 is converted into a current output.

The current-converted current output is amplified by an amplifier circuit constructed of the operational amplifier 32 and the like, and a pressure detection signal is outputted to the output line O.

To compensate for the temperature characteristic of this pressure detecting circuit unit, resistors 26 to 28 are employed. It should be noted that the variable resistors 15 and 16 and so on are employed so as to obtain a desired output, and are adjusted when the semiconductor pressure sensor is manufactured.

It should be understood that the above-explained structure of the semiconductor pressure sensor and the above-mentioned arrangement of the pressure detecting circuit unit are basically similar to those as disclosed in Japanese Laid-open Patent Application No. 55-155253 and No. 2-242121.

This sensor apparatus differs from the conventional sensor apparatus in that (1) capacitors 35, 36, 37 are employed with all resistors 17, 19, 22 directly connected to the power supply line V in the constant current circuit 200 and the amplifier circuit 300, and then the filter circuit is constituted together with the resistors 17, 19, 22. (2) The power supply voltage to the operational amplifiers 29 to 32 is applied from another power supply line V' different from the above-explained power supply line V, and such a filter circuit arranged by the resistor 40 and the capacitor 39 are provided in this power supply line V' and (3) A filter circuit arranged by the resistor 25 and the capacitor 38 is provided in the output line O from the operational amplifier 32.

It should also be noted that the above-described capacitors 35 to 39 are manufactured as, for instance, an MOS capacitor, or a junction capacitor, fabricated in the normal IC, in the integrated sensor chip 5 similar to other circuit elements. One of these capacitors, namely capacitor 35, is illustrated in FIG. 3.

Such a filter circuit arranged by the resistor and the capacitor is employed for the RF noise measure. As to this purpose, various ideas have been proposed. Normally, the filter circuit is provided on the power supply line, as disclosed in Japanese Laid-open Patent Application No. 58-112424. When the filter circuit is formed in the power supply line, the voltages supplied to the various circuits are lowered by the voltage drop caused by the resistor for constituting this filter circuit. Then, when the sensor apparatus of the present invention is employed, such a voltage drop gives unwanted effects to the sensor operations.

Thus, in accordance with this embodiment, the filter circuit is not merely formed in the power supply line V for driving the sensor apparatus and having the sensor characteristic, but the filter circuit is arranged in the pressure detecting circuit unit by utilizing the conventionally employed resistors 17, 19, 22. With employment of such an arrangement, the RF (high frequency) noise measure can be achieved without giving adverse influences to the sensor characteristic.

When the RF noise is mixed into the power source line to the operational amplifiers 29 to 32 within the pressure detecting circuit unit, the adverse influence is given to the sensing operation. As a consequence, another RF noise measure must be provided with respect to this influence. As previously explained, it is not preferable to merely employ the filter circuit in the power supply line V.

Therefore, another power supply line V' separated from the above-described power supply line V, namely the power supply line for driving the operational amplifier irrelevant to the sensor characteristic is branched from the branching point A. The power is supplied via this power supply line V' to the operational amplifiers 29 to 32, and also the filter circuit arranged by the resistor 40 and the capacitor 39 is formed on this power supply line V' in order to achieve the RF noise measure, with respect to the power supplies to the operational amplifiers 29 to 32.

Furthermore, since such an RF noise measure is required also for noise induced from the output line 0, another filter circuit constructed of a resistor 25 and a capacitor 38 is employed on the output line 0.

Figure 4:
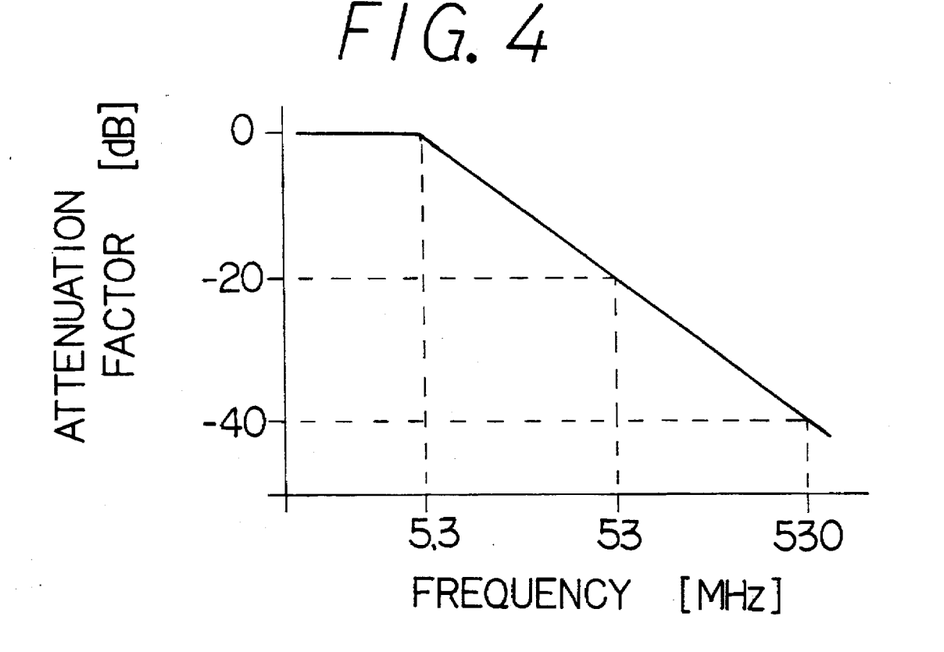
FIG. 4 is a characteristic diagram for representing a filter characteristic of a filter circuit.

The above-explained filter circuit corresponds to a low-pass filter for performing a noise elimination. The cut-off frequency "fo" of the CR filter arranged by such a resistor and a capacitor is expressed by fo=½πCR (Hz). As a result, when the resistance value of the resistor 17 for producing the reference voltage is selected to be 5 kΩ in the constant current circuit 200, if the capacitance of the capacitor 35 is set to 6 pF, then the cut-off frequency fo becomes approximately 5.3 MHz. The resultant filter characteristic is indicated in FIG. 4. Considering noise (for instance, higher then 10 MHz) to be eliminated by the EMI, the noise elimination effect of −20 dB can be achieved under 53 MHz, and the noise elimination effect of −40 dB can be achieved under 530 MHz.

A similar idea may also be applied to the resistors 19 and 22 other then the resistor 17, and thus the capacitors 36 and 37 are employed so as to obtain a desired filter characteristic.

As described above, while utilizing the resistor employed in the pressure detecting circuit unit, such a capacitor having a desirable capacitance based on the resistance value thereof and the filter characteristic required to eliminate the noise is connected to this resistor, so that the high frequency noise entered into the pressure detecting circuit unit can be reduced.

It should be noted that the resistor for constructing the filter circuit is directly connected to the power supply line V and is constructed to carry out the pressure detecting operation in the pressure detecting circuit unit. That is, the resistor 17 corresponds to such a resistor used to produce the reference voltage for determining the value of the constant current in the constant current circuit 200, the resistor 19 corresponds to such a resistor for determining the value of this constant current in relation with the reference voltage and the power supply voltage, and the resistor 22 corresponds to a resistor used to define the operation point of the amplifier circuit 300.

Since the filter circuit arranged by the resistor 40 and the capacitor 39 is provided in the power supply line V', the resistance value of the resistor 40 cannot be selected to be a large value due to a relationship between the consumed current and the allowable voltage drop. Considering these conditions, when the resistance value of the resistor 40 is selected to the 700 Ω, if the capacitance of the capacitor 39 is 40 pF, the cut-off frequency becomes approximately 5.7 MHz, which may provide a similar filter characteristic to that of FIG. 4.

Next, a description is made of an immunity test for the semiconductor pressure sensor with the above-described arrangement according to the embodiment, which is carried out by the Inventors of the present invention.

Figure 5:
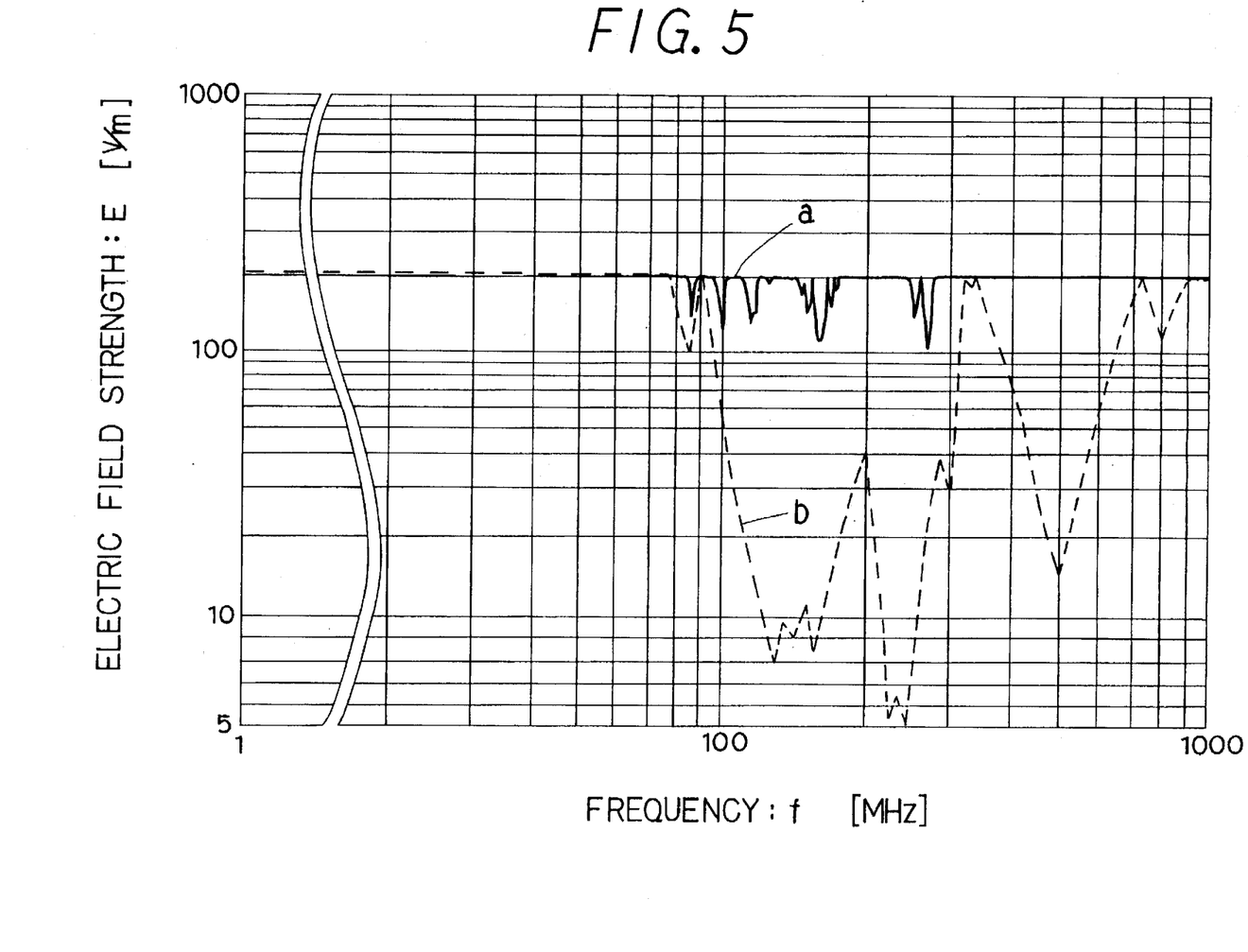
FIG. 5 is a characteristic diagram for showing an immunity test result.

FIG. 5 graphically represents measurement results in electric field strengths E at which the erroneous operation is performed in the EMC level (high frequency: 1 MHz to 1,000 MHz) when the immunity test is conducted by the TEM cell (transverse electro-magnetic cell) apparatus.

Figure 1:
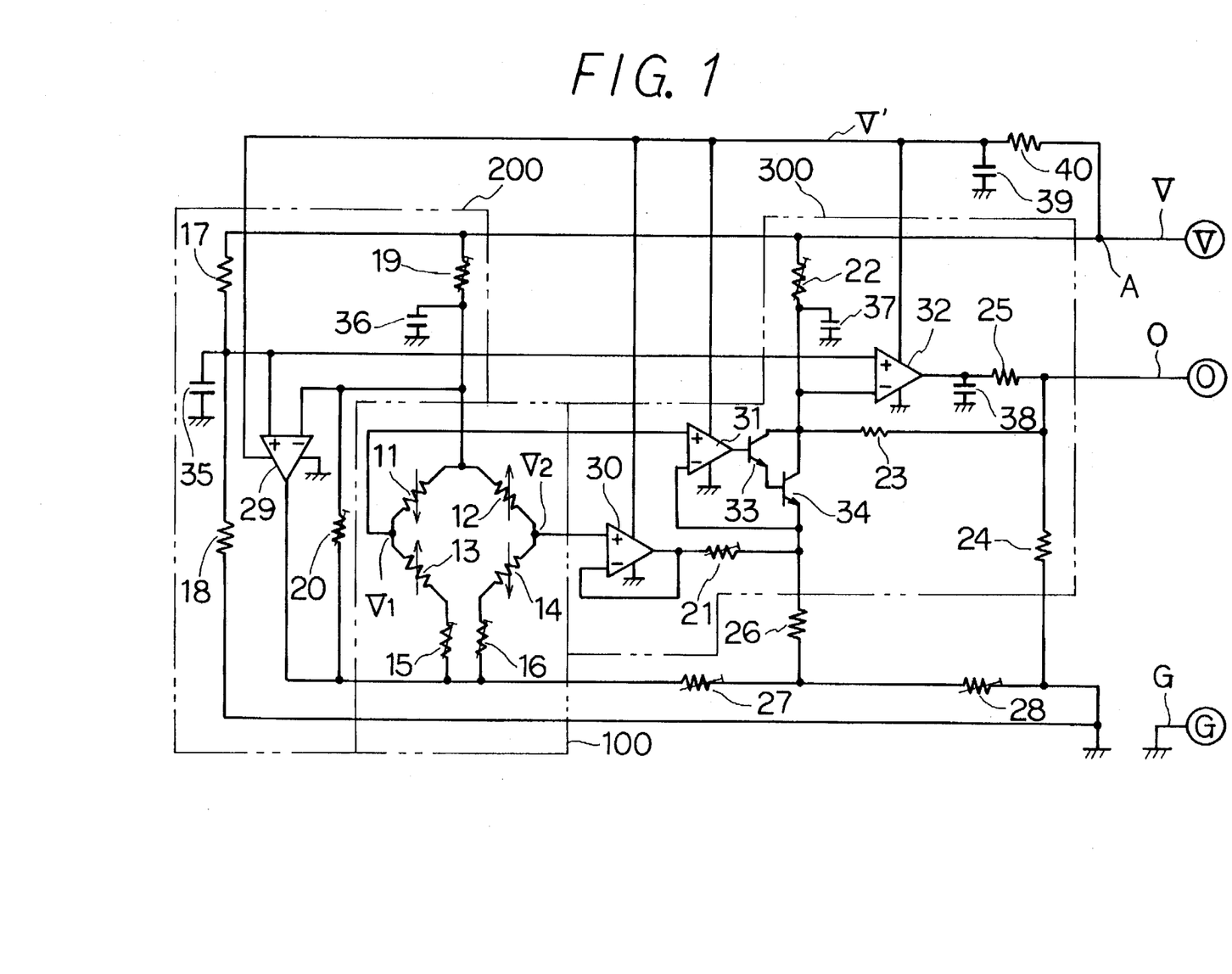
FIG. 1 is a circuit diagram for representing a circuit arrangement of a pressure detecting circuit unit in a semiconductor pressure sensor according to an embodiment of the present invention.

In FIG. 5, a waveform "a" indicated by a solid line shows measurement results obtained by the semiconductor pressure sensor according to this embodiment, shown in FIG. 1. Another waveform "b" indicated by a broken line shows measurement results by the semiconductor pressure sensor, as a comparison example, in the case that the capacitors 35, 36, 37, 38, 39 and the resistors 25, 40 of FIG. 1 are not connected. The RF noise withstanding amounts of both operational amplifiers 29 to 32 are essentially identical to each other.

As apparent from this graphic representation, there is a particular difference between the waveforms "a" and "b". For example, as to the waveform "b", the erroneous operation happens to occur in the low electric field strength within the frequency band f=approximately 75 to 900 MHz. In particular, only the RF noise withstanding amount of E=5 V/m may exist in the frequency range between 220 MHz and 240 MHz, approximately. To the contrary, regarding the waveform "a", the RF noise withstanding amount higher than E=100 V/m may be achieved in the frequency band between 1 MHz and 1,000 MHz.

As understood from the above comparison, it is obvious that such an erroneous operation occurs in the semiconductor pressure sensor according to this embodiment, as compared with the semiconductor pressure sensor employed as the comparison example. Accordingly, even when this semiconductor pressure sensor is used in very severe fields such as radio communications, radios, televisions and telephones under which electromagnetic interference would be given, there is no possibility that this semiconductor pressure sensor is erroneously operated. Therefore, when this semiconductor pressure sensor is employed in the automobile field, very good effects may be achieved.

The Applicant has proposed the semiconductor apparatus with the anti-EMI measure (Japanese Laid-open Patent Application No. 5-327264). In the circuit arrangement of FIG. 4 in this prior patent application, the capacitors are connected between the non-inventing terminals of the operational amplifiers 31, 30 and the ground, whereas the capacitors 38, 39 and the resistors 24, 25, 40 are not connected to the circuit arrangement of FIG. 1 in this embodiment. The Inventors could confirm, by carrying out the immunity test by the same TEM cell apparatus as in FIG. 5 for the circuit arrangement disclosed in this prior application that the RF noise withstanding amount could not be expected as in the waveform "a" of this embodiment, but may be similar to the waveform "b".

As a consequence, in such a place where very severe electromagnetic wave interference would be given, it is preferable to employ the semiconductor pressure sensor according to this embodiment, the circuit arrangement of which is constituted as follows: In the power supply line V defined from the branch point A between the power supply line V and the power supply line V' toward the sensor circuit units 100, 200 and 300, the filter circuit arranged by the resistor 17 and the capacitor 35, the filter circuit arranged by the resistor 19 and the capacitor 36, and the filter circuit arranged by the resistor 22 and the capacitor 37 are provided. Also, the filter circuit formed by the resistor 40 and the capacitor 39 is provided in the power supply line V', and the filter circuit formed by the resistor 25 and the capacitor 38 is provided in the output line 0.

It should be noted that, especially the filter circuit constituted in the power supply line V among the respective filter circuits employed as the RF noise measure is realized by utilizing the resistors 17, 19, 22 directly connected to the power supply lie V and by providing the capacitors 35, 36, 37 in these resistors. This has been arranged by taking account of deterioration in the sensor characteristic caused by the voltage drops in the resistors for constituting the filter circuit and by lowering the supply voltages to the respective circuits. However, the present invention is not limited to this filter circuit arrangement. For instance, the filter circuit may be constituted by newly employing a resistor and a capacitor, which are connected to such a power supply line V defined from the branch point A between the power supply line V and the power supply line V' to the pressure detecting circuit unit.

In this case, the circuit constant of the resistor in the filter circuit may be designed to be an optimum value in combination with the circuit constants of the resistors 17, 19, 22. Thus, while avoiding deterioration in the sensor characteristic, the RF noise measure can be achieved without utilizing the resistors directly connected to the power supply line V.

To the contrary, when the filter circuit is constituted on the power supply terminal side from the branch point A between the power supply line V and the power supply line V', even if the sensor characteristic (circuit constant of resistor) is considered, the voltage drop is produced by the current of the operational amplifier power supply, which flows through the resistor of this filter circuit. Accordingly, the performance deterioration caused by the low sensor output could not be avoided. Therefore, it is not preferable to employ the filter circuit between the branch point A and the power supply terminal.

Considering the above-described explanations, the circuits required as the RF noise measure for the sensor apparatus may be achieved as follows:

(1) The filter circuit is constructed on the power supply line V defined from the branch point A between the power supply line V and the power supply line V' to the sensor circuit unit. Preferably, this filter circuit is arranged by combining the capacitor with the resistor directly, previously connected to the power supply line V. Concretely speaking, the capacitors 35, 36, 37 are provided with all of the resistors 17, 19, 22 directly connected to the power supply line V in the constant current circuit 200 and the amplifier circuit 300, so that each of these filter circuits are constructed together with the resistors 17, 19, 22.

(2) The filter circuit is arranged in the power supply line V' for the operational amplifier power source with in the sensor circuit unit, which is separately connected from the power supply line V. Concretely speaking, the power supply voltages to the operational amplifiers 29 to 32 are applied from another power supply line V' separated from the power supply line V, and also the filter circuit arranged by the resistor 40 and the capacitor 39 is constructed in this power supply line V'.

(3) The filter circuit is arranged between the output of the sensor circuit unit and the output terminal 0. More specifically, the filter circuit constructed of the resistor 25 and the capacitor 38 is arranged in the output line 0 from the operational amplifier 32.

As a consequence, when all of the above-described conditions (1) to (3) are satisfied, it is possible to constitute the sensor apparatus having such an anti-RF noise characteristic as defined in the solid-lined waveform "a" of FIG. 5.

Figure 6:
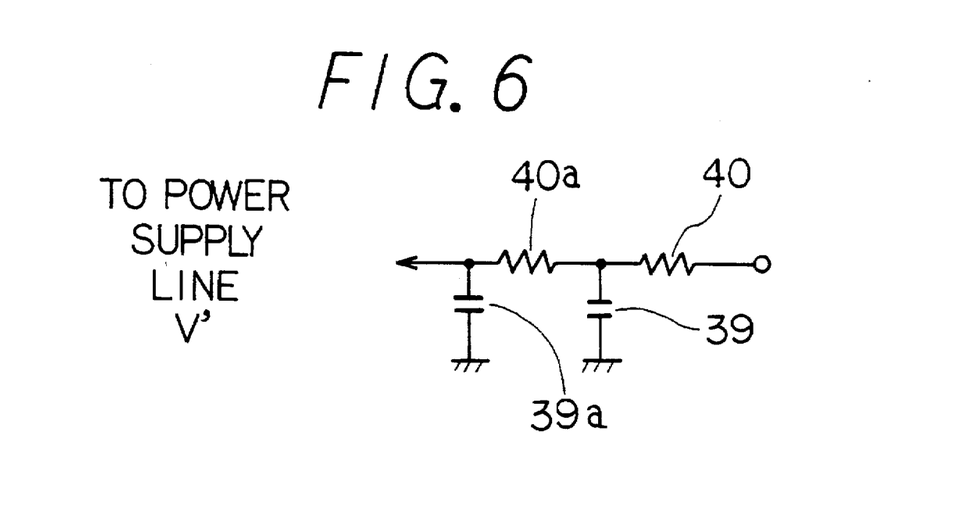
FIG. 6 is a circuit diagram partially representing a circuit arrangement of another filter circuit formed in the power supply line V'.

As the arrangement of the filter circuit employed in the power supply line V', as shown in FIG. 6 such a two-staged filter circuit with additionally employing a resistor 40a and a capacitor 39a may be arranged, or more higher staged filter circuits may be realized.

Figure 7:
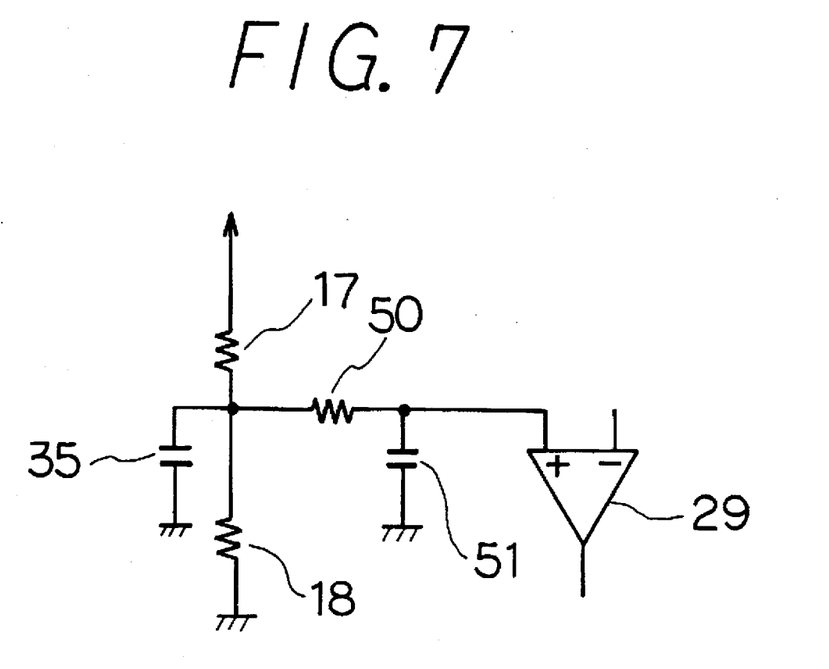
FIG. 7 is a circuit diagram partially representing a circuit arrangement of another filter circuit formed in a constant current circuit.

Since no current flows through the inverting terminal and the non-inverting terminal of the operational amplifier, as shown in FIG. 7, another filter circuit constructed of a resistor 50 having a high resistance value and a capacitor 51 is additionally provided with the filter circuit constructed of the resistor 17 and the capacitor 35, so that a multi-staged filter circuit may be obtained. In this case, since the resistance value of the resistor 50 is large, the capacitance value of the capacitor 51 may be small. Thus, the forming area thereof may be made small, resulting in an integrated form in the sensor chip.

Although the above-described embodiment has been made of the semiconductor pressure sensor, the present invention may be applied to such various sensor apparatus as an acceleration sensor, a magnetic sensor, and an optical sensor.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A sensor apparatus comprising:
   a first power supply line connected to a power supply terminal;
   a second power supply line separately branched from said first power supply line and connected thereto;
   an output line;
   a sensor circuit unit including a first filter circuit connected to said first power supply line so as to receive power therefrom, said sensor circuit detecting a predetermined environmental characteristic and generating a detection signal to said output line based thereon;
   an operational amplifier coupled to said sensor circuit unit to amplify said detection signal, said operational amplifier receiving power from said second power supply line for generating an amplified signal at said output line;
   said first filter circuit of said sensor circuit unit being connected to said first power supply line between a branch point at which said second power supply line branches from said first power supply line and other portions of said sensor circuit unit;
   a second filter circuit connected to said second power supply line; and
   a third filter circuit connected to said output line, wherein said first filter circuit, said second filter circuit, and said third filter circuit reduce high frequency noise.

2. A sensor apparatus as claimed in claim 1, wherein:
   said first filter circuit includes a resistor connected to said first power supply line and a capacitor connected to said resistor.

3. A sensor apparatus as claimed in claim 1, wherein:
   said sensor circuit unit includes a detection circuit for detecting said predetermined environmental characteristic and an amplifier circuit having said operational amplifier for amplifying said detection signal generated by said detection circuit;
   said first filter circuit includes a resistor connected between an input terminal of said operational amplifier and said first power supply line in order to determine an operation point of said operational amplifier; and
   a capacitor connected to said resistor.

4. A sensor apparatus as claimed in claim 1, wherein:
   said sensor circuit unit includes a detection circuit for detecting the predetermined environmental characteristic, and a constant current circuit for providing constant current to said detection circuit;
   said constant current circuit includes i) said operational amplifier, ii) a first resistor connected between one of an inverting input terminal and a non-inverting input terminal of said operational amplifier and said first power supply line for producing a reference voltage used to determine a value of the constant current, and iii) a second resistor connected between the other of the inverting input terminal and the non-inverting input terminal of said operational amplifier and said first power supply line for determining said value of the constant current based on a difference between said reference voltage and power supply voltage; and
   said first resistor is connected to a first capacitor and said second resistor is connected to a second capacitor to thereby constitute said first filter circuit.

5. A sensor apparatus as claimed in claim 1, wherein all of said first power supply line, said second power supply line, said sensor circuit unit, said output line, said first filter circuit, said second filter circuit, and said third filter circuit are fabricated as an integrated sensor chip.

6. A sensor apparatus as claimed in claim 2, wherein all of said first power supply line, said second power supply line, said sensor circuit unit, said output line, said first filter circuit, said second filter circuit, and said third filter circuit are fabricated as an integrated sensor chip.

7. A sensor apparatus as claimed in claim 3, wherein all of said first power supply line, said second power supply line, said sensor circuit unit, said output line, said first filter circuit, said second filter circuit, and said third filter circuit are fabricated as an integrated sensor chip.

8. A sensor apparatus as claimed in claim 4, wherein all of said first power supply line, said second power supply line, said sensor circuit unit, said output line, said first filter circuit, said second filter circuit, and said third filter circuit are fabricated as an integrated sensor chip.

9. A sensor apparatus as claimed in claim 1, wherein said first filter circuit, said second filter circuit, and said third filter circuit are low-pass filters.

10. A sensor apparatus comprising:
a first power supply line connected to a power supply terminal;
a second power supply line separately branched from said first power supply line and connected thereto;
a constant current producing circuit connected to said first power supply line and producing a constant current from a power supply voltage fed through the first power supply line;
a sensor circuit activated by the constant current, said sensor circuit detecting a predetermined environmental characteristic and outputting a detection signal based on the detected predetermined environmental characteristic;
an amplifier circuit connected to said second power supply line and said sensor circuit, said amplifier circuit amplifying the detection signal to generate an amplified detection signal at an output terminal thereof;
each of said constant current producing circuit and said amplifier circuit including an operational amplifier that receives power supplied from said second power supply line;
an output line connected to the output terminal of said amplifier circuit;
a first filter circuit formed as part of one of said amplifier circuit and said constant current producing circuit, said first filter circuit being connected to said first power supply line between a branch point at which said second power supply line branches from said first power supply line and other portions of said one of said constant current producing circuit and said amplifier circuit;
a second filter circuit connected to said second power supply line; and
a third filter circuit connected to said output line, wherein said first filter circuit, said second filter circuit, and said third filter circuit reduce high frequency noise.

11. A sensor apparatus as claimed in claim 10, wherein:
said first filter circuit includes a resistor connected between said first power supply line and an input terminal of said operational amplifier in said amplifier circuit in order to determine an operation point of said operational amplifier, and a capacitor connected to said resistor.

12. A sensor apparatus as claimed in claim 10, wherein all of said first power supply line, said second power supply line, said constant current producing means, said sensor means, said amplifier means, said output line, said first filter circuit, said second filter circuit, and said third filter circuit are fabricated as an integrated sensor chip.

13. A sensor apparatus as claimed in claim 11, wherein all of said first power supply line, said second power supply line, said constant current producing means, said sensor means, said amplifier means, said output line, said first filter circuit, said second filter circuit, and said third filter circuit are fabricated as an integrated sensor chip.

14. A sensor apparatus as claimed in claim 10, wherein said first filter circuit, said second filter circuit, and said third filter circuit are low-pass filters.

15. A sensor apparatus as claimed in claim 10, wherein:
said constant current circuit includes i) a first resistor connected between one of an inverting input terminal and a non-inverting input terminal of said operational amplifier and said first power supply line, said first resistor producing a reference voltage used for determining a value of the constant current, and ii) a second resistor connected between the other one of the inverting input terminal and the non-inverting input terminal of said operational amplifier and said first power supply line, said second resistor determining said value of the constant current based on a difference between said reference voltage and a power supply voltage; and
said first resistor is connected to a first capacitor and said second resistor is connected to a second capacitor to constitute said first filter circuit.

16. A sensor apparatus comprising:
a first power supply line connected to a power supply terminal;
a second power supply line separately branched from said first power supply line and connected thereto;
a constant current producing circuit for outputting a constant current and including a first operational amplifier that receives power from said second power supply line, a first resistor connected between one of an inverting input terminal and a non-inverting input terminal of said first operational amplifier and for producing a reference voltage used to determine a value of the constant current, a second resistor connected between the other of said non-inverting input terminal and said inverting input terminal of said first operational amplifier and said first power supply line, said second resistor determining said value of the constant current based on a difference between said reference voltage and a power supply voltage supplied from said first power supply line, a first capacitor connected to said first resistor and together constituting a first filter circuit, and a second capacitor connected to said second resistor and together constituting a second filter circuit;
a bridge circuit including a strain gage having a resistance value that varies in response to a detected pressure, said bridge circuit generating a detection signal corresponding to said resistance value in response to receiving the constant current from said constant current producing circuit;
an amplifier circuit which amplifies the detection signal generated by said bridge circuit and including a second operational amplifier which receives power from said second power supply line, a third resistor connected between an input terminal of said second operational amplifier and said first power supply line in order to determine an operation point of said second operational amplifier, and a capacitor connected to said third resistor and together constituting a third filter circuit;

an output line connected between said amplifier circuit and an output terminal;

a fourth filter circuit comprising a fourth resistor and a fourth capacitor connected to said second power supply line; and a fifth filter circuit comprising a fifth resistor and a fifth capacitor connected to said output line, wherein said first filter circuit, said second filter circuit, said third filter circuit, said fourth filter circuit, and said fifth filter circuit reduce high frequency noise.

17. A sensor apparatus as claimed in claim 16, wherein all of said first power supply line, said second power supply line, said constant current circuit, said bridge circuit, said amplifier circuit, said output line, said first filter circuit, said second filter circuit, said third filter circuit, said fourth filter circuit, and said fifth filter circuit are formed as an integrated sensor chip.

* * * * *